(No Model.)

L. EDELMAN.
APPARATUS FOR STERILIZING OR COOKING.

No. 513,899. Patented Jan. 30, 1894.

Witnesses
Geo. H. Lothrop
Gertrude H. Anderson

Inventor
Louis Edelman

UNITED STATES PATENT OFFICE.

LOUIS EDELMAN, OF DETROIT, MICHIGAN.

APPARATUS FOR STERILIZING OR COOKING.

SPECIFICATION forming part of Letters Patent No. 513,899, dated January 30, 1894.

Application filed May 11, 1893. Serial No. 473,765. (No model.)

*To all whom it may concern:*

Be it known that I, LOUIS EDELMAN, of Detroit, in the county of Wayne and State of Michigan, have invented a new and useful Improvement in Apparatus for Sterilizing or Cooking, of which the following is a specification.

My invention consists in an improved apparatus for sterilizing or cooking, hereinafter fully described and claimed.

Figure 1:
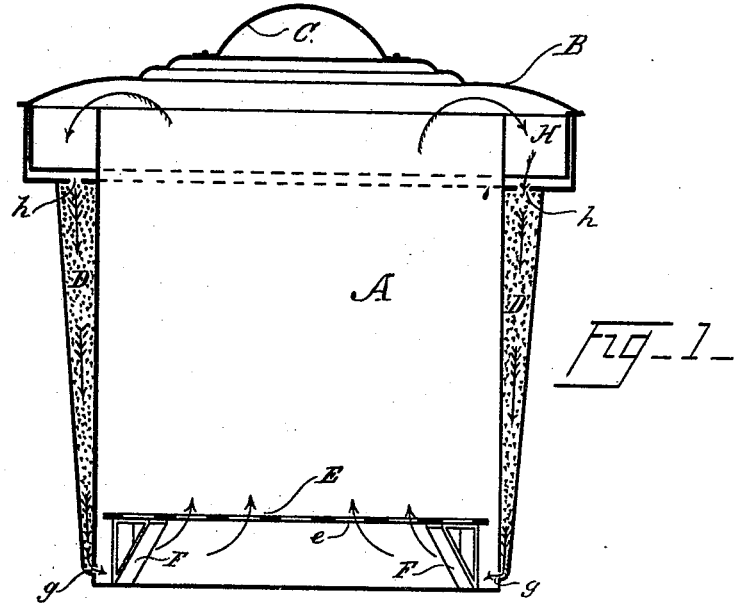
Figure 2:
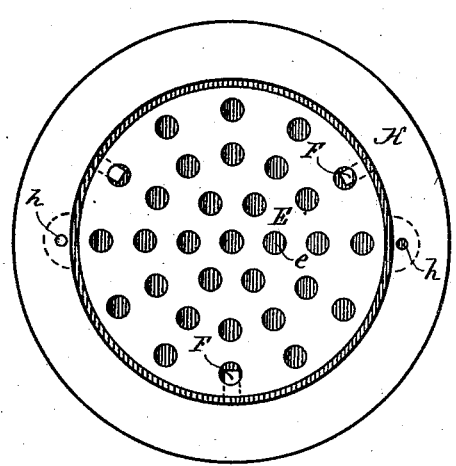
Figure 3:
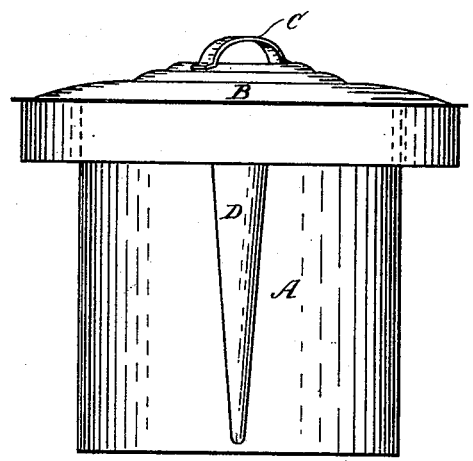

Figure 1 is a vertical central section through the apparatus. Fig. 2 is a top plan view with the cover removed, and Fig. 3 is an elevation of the complete apparatus.

A represents a vessel made of any suitable material, such as tin or other metal, and of such size as is required for the work to be done.

H represents a rim around the upper part of vessel A, forming a trough surrounding the upper end of said vessel.

D D represent two or more passages or pipes which lead from the under side of rim H down to a point near the bottom of vessel A, where they open into said vessel through small holes $g$, to obstruct the passage of water from the water condenser to the base of the vessel A, and if desired the openings from rim H into pipes D may be made quite small, as shown at $h$. Indeed for most purposes I prefer to make this opening quite small. I also fill the passages D with some substance to obstruct or retard the flow of water therethrough, such as sand, small shot or any other suitable substance.

B represents a cover with a depending flange fitting the outer flange or rim H, and provided with a handle C.

For the purpose of supporting articles to be cooked or sterilized, a perforated plate E having perforations $e$ may be supported on brackets F near the bottom of vessel A.

The operation of this apparatus is as follows: The articles to be cooked or sterilized, as meats, or fluids in bottles, are placed within vessel A in suitable holders, the rim H is then nearly filled with water, the cover B put in position, and the vessel A placed upon a stove. Water from rim H flows through passages D D and is delivered slowly into the bottom of vessel A, as it cannot pass rapidly through passages D because of the obstructions therein placed, or because of the fineness of holes $h\ g$. The effect of this is to present only a small quantity of water to the action of heat, so that it is rapidly vaporized. The vapor passes up through vessel A and around the articles therein contained, and is rapidly condensed partially on the under side of cover B, but principally in the water in rim H which acts as a condenser, being so far removed from the fire that it does not become heated to the boiling point.

What I claim as my invention, and desire to secure by Letters Patent, is—

1. A cooker or sterilizer consisting of a vessel carrying at its upper end an annular water condenser and an obstructed passage from said condenser to the bottom of said vessel, substantially as and for the purposes set forth.

2. A cooker or sterilizer, consisting of a vessel having at its upper end a water-containing annular rim constituting a water condenser, and an obstructed passage leading from said water condenser to the base of the vessel, substantially as described.

3. The combination with a cooking vessel having a cover, of an annular water-containing rim arranged at the upper end of the vessel and constituting a water condenser, and a pipe leading from the water condenser to the base of the vessel and containing a filling through which the descending water percolates and by which said water is obstructed in its descent, substantially as described.

LOUIS EDELMAN.

Witnesses:
GERTRUDE H. ANDERSON,
GEO. H. LOTHROP.